April 16, 1968 W. E. HAMMOND 3,377,781
CLEANING ARRANGEMENT FOR BAG FILTERS
Filed March 24, 1965

INVENTOR.
William E. Hammond
BY
Wayne Lang
AGENT

United States Patent Office 3,377,781
Patented Apr. 16, 1968

3,377,781
CLEANING ARRANGEMENT FOR BAG FILTERS
William E. Hammond, Wellsville, N.Y., assignor to The Air Preheater Company, Inc., New York, N.Y., a corporation of Delaware
Filed Mar. 24, 1965, Ser. No. 442,383
1 Claim. (Cl. 55—295)

This invention relates to improvements in gas filter apparatus, and particularly to gas filters of the bag type wherein dust entrained gas is directed through a fabric filter of bag form to separate the dust from the gas.

In apparatus of this general type it is well known that fabric filter bags must be periodically purged of their collected dust in order that the collecting efficiency of the filter bags may be maintained at or near an optimum level. Thus the filter bags are customarily subjected to a mechanical cleaning action such as rapping or knocking, and the flow of gas through the filter is customarily reversed to carry with it the dust removed from the filter.

An obvious disadvantage of such cleaning action is that it requires each filter bag or section of bags to be physically agitated, and it requires that a cumbersome system of flow ducts and valves be provided in order that the gas flow through each filter may be isolated and controlled at will. This usually necessitates the removal from service of the bags being cleaned. Thus certain surplus filter capacity is required to make available at all times sufficient capacity to effectively handle a predetermined flow of dust entrained gas.

A further disadvantage of the above arrangement is that fabric filter bags inherently stretch and then sag and wrinkle so that when subjected to severe shaking or agitation they rapidly deteriorate and accordingly have a relatively short useful life. This is especially serious when considered with respect to filter bags that are comprised of glass fibers which, although desirable in many respects, are subject to even more rapid deterioration from wrinkling and sagging than are bags of the usual organic fibers.

It is accordingly a primary object of the present invention to provide a bag filter for dust-laden gases in which the bags being cleaned of their dust deposits need not be isolated from the rest of the system and removed from service.

Another object of this invention is to provide a cleaning arrangement for bag filters that effectively increases the service life of the filter members.

It is a further object of this invention to provide apparatus for cleaning filter bags which is both rugged in design and positive in operation.

Figure 1:
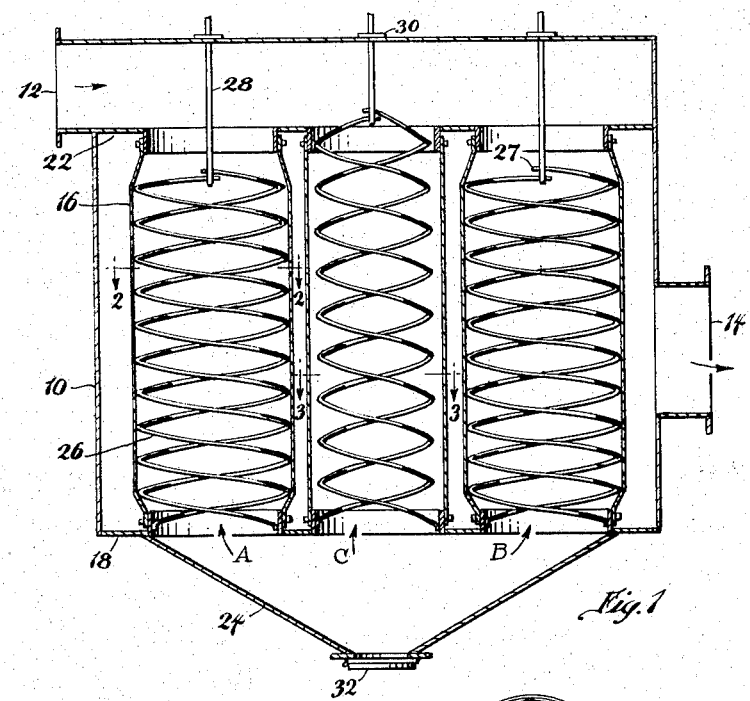
Figures 2, 3:
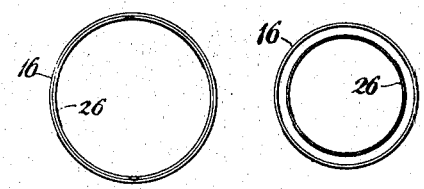
Figures 4, 5:
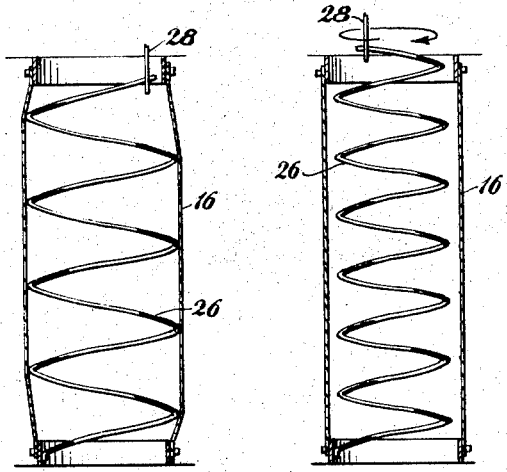

These and other objects of my invention will be more apparent from the accompanying specifications and drawings which:

FIGURE 1 is a diagrammatic view showing the essential features of the apparatus, FIGURE 2 is a sectional view of a bag filter as seen from line 2—2 of FIGURE 1, FIGURE 3 is a sectional view of a bag filter as seen from line 3—3 of FIGURE 1, FIGURE 4 is a diagrammatic view of a modified form of apparatus, and FIGURE 5 is a diagrammatic view of the apparatus of FIGURE 4 as seen in a cleaning position.

Referring more particularly to the drawings, a housing 10 is provided with an inlet port 12 for dust entrained gas and an outlet port 14 for the exhaust of dust-free or filtered gas therefrom. A series of bag filters 16 are positioned intermediate the inlet port 12 and the outlet port 14 in order that gas flowing between inlet and outlet ports is caused to flow into each bag and then through its perforate surface before it is exhausted out of port 14.

The filter bags 16 are of tubular configuration and are secured at their lower ends to an apertured tube sheet 18, while the upper end of each bag is secured to an upper tube sheet 22. A dust hopper 24 positioned beneath the filter bags 16 is adapted to receive accumulations of dust that collect on the surface of the bags as the gas passes therethrough en route from the inlet port 12 to the outlet port 14.

In accordance with the invention, each filter bag 16 is provided with an internal support structure 26 that is secured at its lower end to the lower tube sheet 18 and is secured at 27 to the actuating means 28. In most instances it is preferred to fixedly secure the actuating means to the support structure 26. However, on occasion when natural stiffness or rigidity of the support structure 26 resists flexing by the actuating means 28, it may be desirable to provide a pivotal connection at 27.

The support structure 26 in each bag 16 preferably comprises a pair of oppositely extending spiral wires of the type shown in FIGURE 1. The actuating means 28 extend upward from connections 27 through packing means 30 in the upper wall of housing 10 to a location outside the housing where they may be actuated either singly or in groups to move the support structure as may be required.

Moving actuator 28 axially downward will thus cause the spiral support structure 26 connected thereto to axially contract and radially expand until it pushes outward against the surrounding bag 16 to hold it in tension in the manner illustrated in a slightly exaggerated form by bags A and B of FIGURE 1. Conversely, moving actuator 28 axially upward will cause the spiral support structure 26 to axially expand and radially contract so that it is drawn in and away from the surrounding bag filter 16 in the manner illustrated by bag C of FIGURE 1.

During normal operating conditions the spiral supports 26 are compressed axially until they push outward against the inner surface of the surrounding bag filters 16 and hold them in tension in a slightly expanded position. Bags thus held are not subject to sag, wrinkling or a general loosening that promotes destruction of the fabric, even though the housing should be subjected to severe thermal distortion.

Dust entrained gas from any predetermined source is admitted to housing 10 through inlet port 12 and is directed into the tubular bag filters 16, through the porous walls of the bag filter fabric, and thence to the outlet pore 14. As the gas flows through the bags 16, the dust entrained therein is deposited upon the inner surface of the bags until a "filter cake" of dust clinging to the inner surface of each bag and its spiral support substantially reduces the flow of gas therethrough. When such conditions obtain, the actuating means 28 may be moved upward to elongate the spiral support 26 and accordingly release the tension upon the surrounding bags 16. As the spiral supports 26 are moved and the tension upon the filter bags is released, the filter cake adhering to the inner surface of the bags and the spiral supports is broken loose therefrom and permitted to fall by gravity into the subjacent hopper 24 where it is collected for ultimate removal from the housing through a dust valve 32.

The spiral support structure 26 may alternatively be comprised of a single spirally wound member of the type illustrated by FIGURES 4 and 5. In this arrangement the spiral supports 26 may be moved axially to vary their diameter in the manner defined for the apparatus of FIGURE 1, or the actuator may be imparted an arcuate movement in the manner illustrated in FIGURE 5 to provide an increased number of convolutions of decreased diameter in each filter bag. In either case the spiral support structure 26 is drawn away from the filter bag 16 in the manner illustrated by FIGURES 3 and 5 so that the bags hang loosely between the tube sheets 18 and 22. As the bags 16 and spiral supports 26 are moved, the filter cake carried thereby is released and permitted to fall by gravity to the hopper 24 for ultimate removal from the apparatus.

While this invention has been described with reference to the embodiment illustrated in the drawing, it is evident that various changes may be made without departing from the spirit of the invention, and it is intended that all matter contained in the above description or shown in the accompanying drawings shall be interpreted as illustrative and not in a limiting sense.

I claim:

1. Apparatus for the removal of dust from a carrier gas comprising a housing having an inlet for dust entrained gas and an outlet for the exhaust of clean gas therefrom, a dust hopper subjacent said housing, a first apertured tube sheet intermediate the inlet and outlet ports, a second apertured tube sheet intermediate the outlet port and the dust hopper, open-ended filter bags aligned with the apertures in spaced tube sheets and secured thereto, a pair of oppositely inclined coil springs in each filter bag extending between opposite ends thereof having one end secured to the second tube sheet and one end free to move axially in said filter bag between an axially contracted filtering and an axially extending cleaning position, a reciprocable actuating rod extending axially through said housing to the paired coil springs movable between the filtering and cleaning positions, packing means in said housing surrounding the reciprocable actuating rod and adapted to preclude fluid leakage around the actuating rod, and means connecting the actuating rod to the free ends of the coil springs in each filter bag whereby movement of the actuating rod to the filtering position axially contracts and radially distends the coil spring and the surrounding bag to hold the filter bag tightly while movement of the actuating rod to the cleaning position axially elongates and radially contracts the coil spring to permit relaxing the surrounding bag and separation of the collected particles therefrom.

References Cited

UNITED STATES PATENTS

| | | | |
|---|---|---|---|
| 534,068 | 2/1895 | Holland | 55—291 |
| 2,454,884 | 11/1948 | Peaden | 15—242 X |
| 2,594,417 | 4/1952 | Gerber | 55—379 X |
| 2,713,921 | 7/1955 | Turner | 210—323 X |
| 3,092,479 | 6/1963 | Hedberg | 55—379 X |
| 3,209,521 | 10/1965 | Roujob | 55—379 X |

FOREIGN PATENTS

| | | |
|---|---|---|
| 157,349 | 12/1904 | Germany. |
| 761,384 | 10/1952 | Germany. |
| 294,501 | 7/1928 | Great Britain. |
| 449,828 | 7/1936 | Great Britain. |
| 513,347 | 10/1939 | Great Britain. |
| 454,934 | 2/1950 | Italy. |

HARRY B. THORNTON, *Primary Examiner.*

D. TALBERT, *Assistant Examiner.*